(12) United States Patent
Elferich et al.

(10) Patent No.: US 10,680,510 B2
(45) Date of Patent: Jun. 9, 2020

(54) AC/DC PFC CONVERTER USING A HALF BRIDGE RESONANT CONVERTER, AND CORRESPONDING CONVERSION METHOD

(71) Applicant: SIGNIFY HOLDING B.V., Eindhoven (NL)

(72) Inventors: Reinhold Elferich, Aachen (DE); David Llewellyn John, Willingham (GB)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 16/078,871

(22) PCT Filed: Mar. 23, 2017

(86) PCT No.: PCT/EP2017/056939
§ 371 (c)(1),
(2) Date: Aug. 22, 2018

(87) PCT Pub. No.: WO2017/167640
PCT Pub. Date: Oct. 5, 2017

(65) Prior Publication Data
US 2019/0058393 A1    Feb. 21, 2019

(30) Foreign Application Priority Data

Mar. 31, 2016   (EP) ..................................... 16163247

(51) Int. Cl.
*H05B 33/08*     (2006.01)
*H02M 1/42*      (2007.01)
(Continued)

(52) U.S. Cl.
CPC ....... *H02M 1/4241* (2013.01); *H02M 1/4233* (2013.01); *H02M 3/335* (2013.01);
(Continued)

(58) Field of Classification Search
CPC .......... H02M 1/4241; H02M 3/33569; H02M 1/4233; H02M 3/335; H02M 2001/007;
(Continued)

(56) References Cited

U.S. PATENT DOCUMENTS

2003/0043599 A1 *  3/2003  Duerbaum .......... H02M 3/3376
                                                          363/17
2009/0290385 A1   11/2009  Jungreis et al.
(Continued)

FOREIGN PATENT DOCUMENTS

WO      2016020213 A2    2/2016

*Primary Examiner* — Renan Luque
*Assistant Examiner* — Jianzi Chen
(74) *Attorney, Agent, or Firm* — Daniel J. Piotrowski

(57) ABSTRACT

An AC/DC PFC converter comprises an LLC PFC pre-regulator and a DC/DC converter output stage. The output stage has a feedback unit adapted to provide a feedback signal (in addition to the conventional feedback of the bus voltage error) to the control circuit of the PFC pre-regulator for modulating the controlled output voltage of the PFC pre-regulator in dependence on the output power and/or the input current and voltage. In this way, the total harmonic distortion of the input of the converter can be reduced by controlling the gate switching in the PFC pre-regulator.

15 Claims, 9 Drawing Sheets

(51) Int. Cl.
  *H02M 3/335*  (2006.01)
  *H05B 45/37*  (2020.01)
  *H02M 1/00*   (2006.01)

(52) U.S. Cl.
  CPC ........ *H02M 3/33569* (2013.01); *H05B 45/37* (2020.01); *H02M 2001/007* (2013.01); *Y02B 20/348* (2013.01); *Y02B 70/126* (2013.01); *Y02B 70/1433* (2013.01)

(58) Field of Classification Search
  CPC .............. H05B 33/0815; Y02B 20/348; Y02B 70/1433; Y02B 70/126
  See application file for complete search history.

(56) References Cited

U.S. PATENT DOCUMENTS

| | | | |
|---|---|---|---|
| 2010/0246220 A1* | 9/2010 | Irving | H02M 1/4225 363/78 |
| 2012/0106206 A1* | 5/2012 | Tang | H02M 1/4258 363/21.02 |
| 2014/0091718 A1 | 4/2014 | Brinlee | |
| 2014/0140113 A1* | 5/2014 | Oh | H02M 1/4241 363/89 |
| 2014/0369081 A1 | 12/2014 | Maniktala | |
| 2016/0079868 A1* | 3/2016 | Yeh | H02M 3/33538 363/21.09 |
| 2017/0223792 A1* | 8/2017 | Elferich | H02M 1/4241 |

\* cited by examiner

AC/DC PFC CONVERTER USING A HALF BRIDGE RESONANT CONVERTER, AND CORRESPONDING CONVERSION METHOD

CROSS-REFERENCE TO PRIOR APPLICATIONS

This application is the U.S. National Phase application under 35 U.S.C. § 371 of International Application No. PCT/EP2017/056939, filed on Mar. 23, 2017 which claims the benefit of European Patent Application No. 16163247.6, filed on Mar. 31, 2016. These applications are hereby incorporated by reference herein.

FIELD OF THE INVENTION

This invention relates to the use of half bridge resonant converters. In particular, the invention relates to the use of such resonant converters to form part of a power converter to provide AC/DC conversion with power factor correction.

BACKGROUND OF THE INVENTION

So-called resonant converters have a resonant circuit, which can be a series or parallel or series-parallel resonant circuit. When configuring converters, one aim is to keep losses low. For example, resonant converters which comprise an LLC series-parallel resonant circuit having two inductances and one capacitance are well-known. Such converters have the advantage that energy-efficient operation with relatively low switching losses is possible.

Resonant LLC converters are well known for use within LED drivers. The converters can be configured or operated as a constant current source or a constant voltage source. A constant current source can be used to drive an LED arrangement directly, thus enabling a single stage driver. Constant voltage sources can be used, for example, for LED modules which have further driver electronics in order to ensure a corresponding power supply to the LEDs with a predetermined current from the output voltage provided by the constant voltage source.

The LLC converter comprises a switching arrangement (which together with the gate driving arrangement is generally referred to as the inverter) for controlling the conversion operation, and the switching is controlled using feedback or feedforward control, in order to generate the required output.

Another function implemented within a power converter which is supplied with mains (or other AC) power is power factor correction (PFC). The power factor of an AC electrical power system is defined as the ratio of the real power flowing to the load to the apparent power in the circuit. A power factor of less than one means that the voltage and current waveforms are not in phase, reducing the instantaneous product of the two waveforms. The real power is the capacity of the circuit for performing work in a particular time. The apparent power is the product of the current and voltage of the circuit. Due to energy stored in the load and returned to the source, or due to a non-linear load that distorts the wave shape of the current drawn from the source, the apparent power will be greater than the real power.

If a power supply is operating at a low power factor, a load will draw more current for the same amount of useful power transferred than for a higher power factor.

The power factor can be increased using power factor correction. For linear loads, this may involve the use of a passive network of capacitors or inductors. Non-linear loads typically require active power factor correction to counteract the distortion and raise the power factor. The power factor correction brings the power factor of the AC power circuit closer to 1 by supplying reactive power of opposite sign, adding capacitors or inductors that act to cancel the inductive or capacitive effects of the load.

Active PFC makes use of power electronics to change the waveform of the current drawn by a load to improve the power factor. Active PFC circuits may for example be based on buck, boost or buck-boost switched mode converter topologies. Active power factor correction can be single-stage or multi-stage.

In the case of a switched mode power supply, a PFC boost converter is for example inserted between the bridge rectifier and the mains storage capacitor. The boost converter attempts to maintain a constant DC bus voltage on its output while drawing a current that is always in phase with and at the same frequency as the line voltage. Another switched-mode converter inside the power supply produces the desired output voltage or current from the DC bus.

Due to their very wide input voltage range, many power supplies with active PFC can automatically adjust to operate on AC power for example from about 110 V to 277V.

Power factor correction may be implemented in a dedicated power factor correction circuit (called a pre-regulator), for example placed between the (mains) power supply and the switch mode power converter which then drives the load. This forms a dual stage system, and this is the typical configuration for high power LED applications (for example more than 25 W). The power factor correction may instead be integrated into the switch mode power converter, which then forms a single stage system.

This invention relates in particular to a two-stage circuit having an isolating PFC front end and a non-isolating back end output stage. The front end is for example a resonant LLC converter and the output stage may be a buck converter. The LLC front end is capable of handling a wide AC input voltage range if the power conversion profile essentially corresponds to that required for a high power factor operation.

An example of a resonant DC/DC converter is shown in FIG. 1 in general form.

The circuit comprises a DC input terminal 2 (labeled B in FIG. 1 and all other figures) for receiving a rectified output, and which connects to a half-bridge having a first power switch 28 and a second power switch 30. The first switch and the second switch can be identical, and the half-bridge may for example be operated at a symmetrical 50% duty cycle. These switches can be in the form of field-effect transistors.

A resonant tank circuit 25 is connected to an output node, labeled X in FIG. 1 and all other figures between the two switches 28, 30.

Each switch has its timing of operation controlled by its gate voltage. For this purpose, there is a control block 31 (including a low voltage supply). The block 31 receives a control signal CTRL for controlling the gate voltages and a supply voltage SUP. Feedback (not shown) is used to determine the timing of the control of the switches 28, 30. The output of the resonant tank circuit 25 connects to a rectifier 32 and then to the load, in parallel with a smoothing capacitor $C_{DC}$.

During operation of the converter, the controller 31 controls the switches, at a particular frequency and in complementary manner.

FIG. 2 shows one more detailed example of the circuit of FIG. 1.

In this example, the resonant tank 25 is in the form of an LLC resonant circuit, and it may be used to form a PFC stage. The circuit may thus be used as a PFC pre-regulator by having a controlled output voltage. It could also be used as a single stage LED driver by having a controlled output current.

The circuit comprises a mains input 10 which is followed by a rectifier bridge 12 having a high frequency filter capacitor 14 at the output. This generates the supply for the input terminal 2 (node B) of FIG. 1.

This example shows a converter with an isolated output. For this purpose, the converter comprises a primary-side circuit 16 and a secondary side 18. There is electrical isolation between the primary-side circuit 16 and the secondary side 18. A transformer comprising a primary coil 20 and a secondary coil 22 is provided for the isolation. The transformer has a magnetizing inductance 20 which also acts as one of the inductances of the series LLC resonant circuit. The LLC resonant circuit 25 has a second inductance 24, and a capacitance (formed as two capacitors 26 and 27 in this example).

In an LLC circuit, the inductances and capacitor may be in any series order. The inductor may comprise discrete components or it may be implemented as leakage inductances of the transformer.

The primary-side circuit 16 comprises the half-bridge 28, 30 and the resonant tank circuit 25.

The secondary side 18 has the rectifier 32 which is connected downstream of the secondary coil 22 and which can be formed, for example, by a first diode arrangement of diodes 32a and 32b and a second diode arrangement of diodes 34a and 34b.

FIG. 2 shows a full-bridge rectifier and a single secondary coil which couples at its ends to the rectifier circuit. The low frequency (e.g. 100 Hz) storage capacitor $C_{DC}$ is connected between the outputs of the rectifier. The LED load or other output stage is represented in this figure by a resistor. In the case of an LED load, it comprises an LED or a plurality of LEDs.

The circuit shown in FIG. 2 may be used as an AC/DC PFC single stage converter or as PFC pre-regulator. FIG. 3 shows an alternative LLC half bridge topology, as a modification to FIG. 2 (and showing only the DC/DC conversion stage) in which the secondary coil 22 has a center tap and the full wave rectifier 32 is then implemented by two diodes. The LLC capacitor is also shown as a single component 35.

Half bridge resonant converters are used already in many applications like DC/AC converters for lighting applications, e.g. low- and high-pressure discharge lamp circuits, and DC/DC converters, e.g. DC power supplies and LED drivers.

The control block 31 drives the two power switches 28, 30 to conduct in an alternating sequence on and off, with a small non-conduction phase (dead time) used to avoid cross conduction of the power switches. A high gate drive signal turns on one switch and turns off the other switch and a low gate drive signal turns off the one switch and turns on the other switch. The advantage of using a resonant half bridge converter is that the current output current taken from the switching node X has no DC component and if this current has a phase lag, with respect to the switching node voltage $V_X$, it can serve to discharge the parasitic output capacitance of the switch before it will be switched on.

The LLC circuit is susceptible to variations of its output voltage, which in a two stage circuit is the bus voltage for the output stage. In a typical design, the bus voltage is controlled to have a constant average value, and the 100 Hz (or 120 Hz) bus voltage ripple only depends on the bus (or storage) capacitor as well as on the converted power.

Designing the LLC-PFC pre-regulator for a given operating range in terms of power and AC-input voltages, taking into account the need for removing voltage ripple, may lead to compromises in terms of size and/or the efficiency at light load operation. The maximum mains voltage at the minimum load determines the maximum frequency operation point the converter has to be designed for.

Another issue is that in some low cost implementations of the circuit the input current waveform of the LLC circuit can deviate from the AC input voltage resulting in non-zero total harmonic distortion. This can be reduced by adapting the design (for example with an increased turns ratio). This can however lead to an overall decrease of efficiency due to an increase of the reactive current.

This invention relates to an improvement to the system in order to address these compromises in terms of efficiency, power factor and component size.

US 2012/106206 discloses a power supply having a single stage converter for performing power factor correction to reduce high-frequency harmonics in the input current and performing resonant conversion to achieve zero-voltage switching or zero-current switching for power conversion. The inventive single stage converter includes a switching circuit, a resonant circuit, a power control circuit, and a square wave generator. The switching circuit includes at least one switch and the resonant circuit includes a LLC resonant tank. The power control circuit includes a proportional differential circuit such as a power amplifier configured in a negative feedback topology, and the square wave generator is configured to generate driving signals based on the frequency modulation control signal generated by the comparison of the sensed input current and a user-defined power level input, thereby allowing the square wave generator to regulate the switching operation of the switching circuit.

SUMMARY OF THE INVENTION

The invention is defined by the claims.

Examples in accordance with a first aspect of the invention provide an AC/DC PFC converter, comprising:
  a PFC pre-regulator, comprising:
    an AC input;
    a rectifier for rectifying a mains voltage;
    a half bridge inverter comprising a high side switch and a low side switch, wherein an output is defined from a node between the switches;
    an LLC circuit coupled to the output; and
    a control circuit for generating a gate drive signal for controlling the switching of the high side and low side switches thereby to generate a controlled output voltage, wherein a high gate drive signal turns on one switch and turns off the other switch and a low gate drive signal turns off the one switch and turns on the other switch; and
  an output stage, comprising:
    a DC/DC converter;
    a feedback unit adapted to provide a feedback signal to the control circuit of the PFC pre-regulator for modulating the controlled output voltage of the PFC pre-regulator in dependence on at least the output power of the output stage, wherein a set-point for the controlled output voltage is varied synchronously with the mains voltage.

In this converter, there is feedback from the output stage to the PFC pre-regulator which serves to modulate the output voltage of the PFC pre-regulator. The modulation may be slow to adapt to the general output level or it may be fast for example at the speed of the resonant half bridge inverter, i.e. faster than the mains AC signal. In the latter case, the shape of the waveform may be controlled, in particular to obtain a less distorted output current.

The feedback unit also controls DC/DC converter, in particular for providing a regulated output current from the overall converter.

The control circuit may be for generating a gate drive signal in dependence on an electrical feedback parameter from the LLC circuit. This feedback system provides regulation of the output voltage of the PFC pre-regulator.

The control circuit is for example adapted to set a threshold level for the electrical feedback parameter in dependence on the feedback signal and the rectified input voltage without measurement of the input current.

This arrangement avoids the need to use a measured input current as an input to the control circuit, by using the electrical parameter from the LLC circuit to represent the input current. The desired PFC function is still able to give a virtually resistive input impedance.

The use of feedback from the output stage to derive information about the shape of the input current/voltage thus avoids the need to measure the input current. This avoids losses and extra circuitry.

The measurement of current is replaced with a more simple voltage measurement. This also eases the use of standard boost PFC controller integrated circuits.

The electrical feedback parameter preferably comprises a voltage across a capacitor of the LLC circuit, which is representative of the input current.

The control circuit is for example adapted to compare the voltage across the capacitor of the LLC circuit with a threshold at a switching instant of the gate drive signal. The circuit can in this way be designed so that the input current is virtually proportional to the voltage across the LLC capacitor at the switching instants.

The output stage is preferably a switch mode power converter, such as a buck converter.

The feedback unit is preferably adapted to provide a feedback signal to the control circuit of the PFC pre-regulator for modulating the controlled output voltage of the PFC pre-regulator in dependence on the amplitude and phase of the input voltage and the output power.

The PFC control is thus implemented by both the PFC pre-regulator and the output stage.

The amplitude and phase of the input voltage may be derived by the feedback unit from the frequency of a high frequency ripple on the controlled output voltage. This avoids the need for a feedforward signal between the PFC pre-regulator stage and the output stage. However, an alternative is for the amplitude and phase of the input voltage to be derived by the feedback unit based on a feedforward signal from the PFC pre-regulator. This feedforward signal may then need to be isolated, for example with an opto-isolator.

The input voltage is used in the pre-regulator and can thus be provided as a feed-forward signal. However, controlling the power factor without input current sensing and control results in a non-unity power factor. In order to improve the power factor, a power factor control loop may be provided on the primary side, but this would require an extra controller as well as extra circuitry effort to measure the input power. Thus, an alternative is to control the power factor by manipulating the bus voltage (i.e. the output voltage of the pre-regulator), which in turn can be manipulated by manipulating the control error of that bus voltage. This control error is available on the secondary side.

In this way, there is a higher modularity of the power converter building blocks. A simple (low cost) front end can be combined with a simple back end for basic functionality. A better performance (for example better total harmonic distortion of the pre-regulator and part-load efficiency) can be achieved using suitable software of the secondary side controller, in which the bus voltage and the power data is already available and the mains voltage phase can easily be derived from the low frequency bus voltage ripple.

In some high-end drivers the value of the mains voltage needs to be made available on the secondary side. In this case the value of the mains voltage may be used directly.

The control unit may comprise an oscillator and then controls the oscillation frequency, or else the control unit may comprise a latch and control the timing of the latch switching.

In the case of a latch, the timing of the latch switching may be dependent on the electrical feedback parameter. This provides a self-resonant switching operation.

The latch may then comprise a flip flop, wherein one of the set and reset timings is controlled in dependence on the electrical feedback parameter and the other of the set and reset timings is controlled based on a fixed delay.

The invention also provides an LED driver, comprising an AC/DC PFC converter as defined above.

Examples in accordance with another aspect of the invention provide an AC/DC PFC conversion method, comprising:

operating a PFC pre-regulator by:
    rectifying a mains voltage;
    controlling a half bridge inverter comprising a high side switch and a low side switch by generating a gate drive signal and providing an output from a node between the switches to an LLC circuit thereby to generate a controlled output voltage, wherein a high gate drive signal turns on one switch and turns off the other and a low gate drive signal turns off the one switch and turns on the other switch; and
    providing an output from the LLC circuit to an output stage; and
    operating the output stage by:
    implementing DC/DC conversion; and
    providing a feedback signal from the output stage to the PFC pre-regulator for modulating the controlled output voltage of the PFC pre-regulator in dependence on the at least the output power of the output stage, wherein a set-point for the controlled output voltage is varied synchronously with the mains voltage.

The method may comprise providing a feedback signal to the PFC pre-regulator for modulating the controlled output voltage of the PFC pre-regulator also in dependence on amplitude and phase of the input voltage. The amplitude and phase of the AC input voltage may be derived either from the frequency of a high frequency ripple on the controlled output voltage or from a feedforward signal from the PFC pre-regulator.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an AC/DC PFC converter which comprises an LLC PFC pre-regulator and a DC/DC converter output stage. The output stage has a feedback unit adapted to provide a feedback signal (in addition to the conventional feedback of the bus voltage error) to the control circuit of the PFC pre-regulator for modulating the controlled output voltage of the PFC pre-regulator in dependence on the output power and/or the input current and voltage. In this way, the total harmonic distortion of the input of the converter can be reduced by controlling the gate switching in the PFC pre-regulator.

The invention is particularly concerned with a front end PFC application of an LLC converter followed by a DC/DC converter at the output. This front end design poses several problems for the feedback control of the inverter switch arrangement, which cannot be mastered by the conventional frequency control approach. This mainly has to do with the high gain ratio requirements. The gain ratio is the ratio between the maximum and the minimum gain.

The gain ratio problem can be relaxed if instead of the switching frequency, a threshold for an LLC state variable is used as the manipulating variable for controlling the input current. For example, a threshold voltage may be set for the capacitor voltage across the capacitor of the LLC tank. Alternatively, the transformer voltage, or the transformer input current can also be used.

Figures 4, 5:
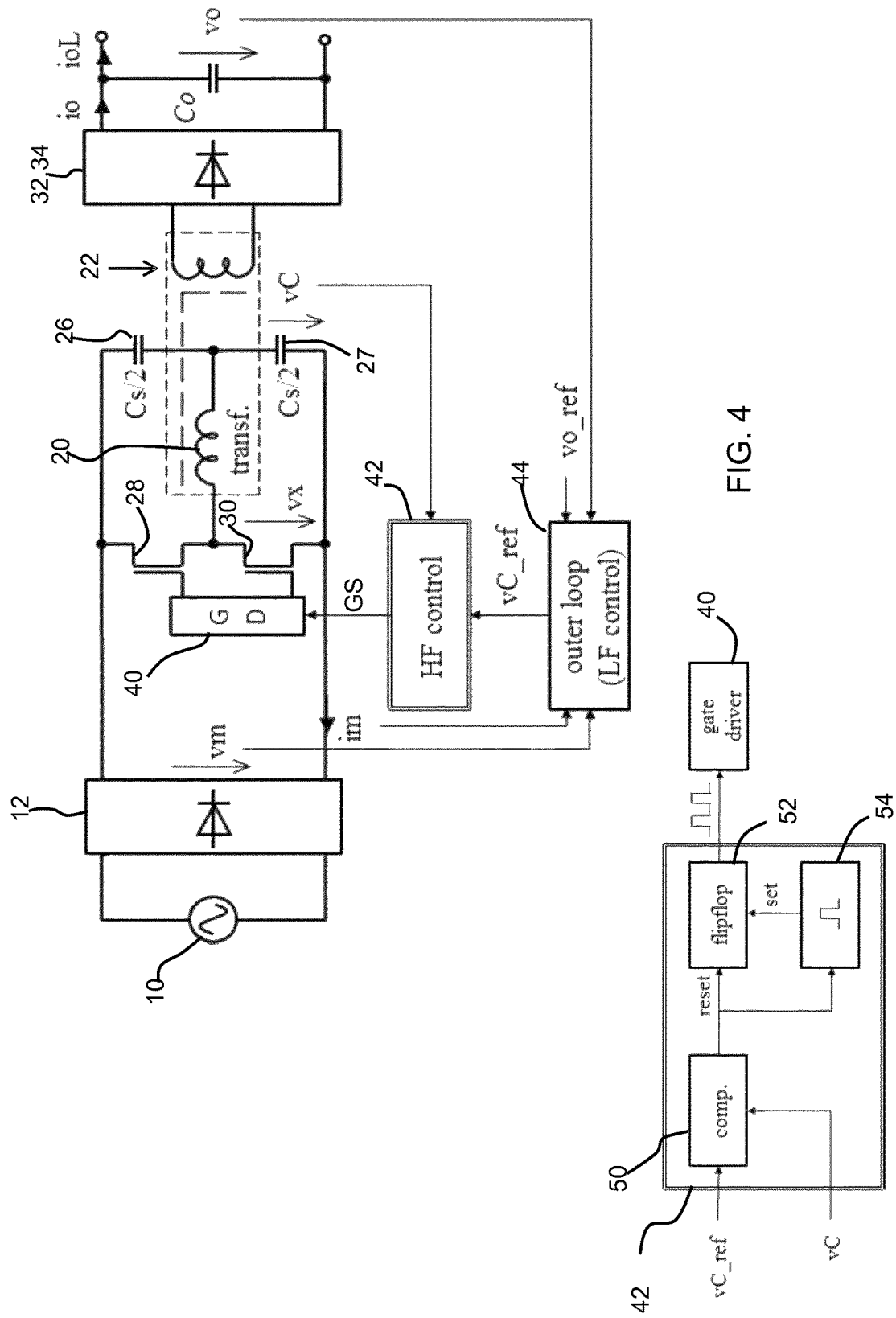
FIG. 4 shows another example of AC/DC PFC LLC converter circuit.
FIG. 5 shows the controller in FIG. 4 in more detail for a single threshold voltage implementation.

FIG. 4 shows an AC/DC LLC converter circuit using the capacitor voltage as the control variable.

Figure 1:
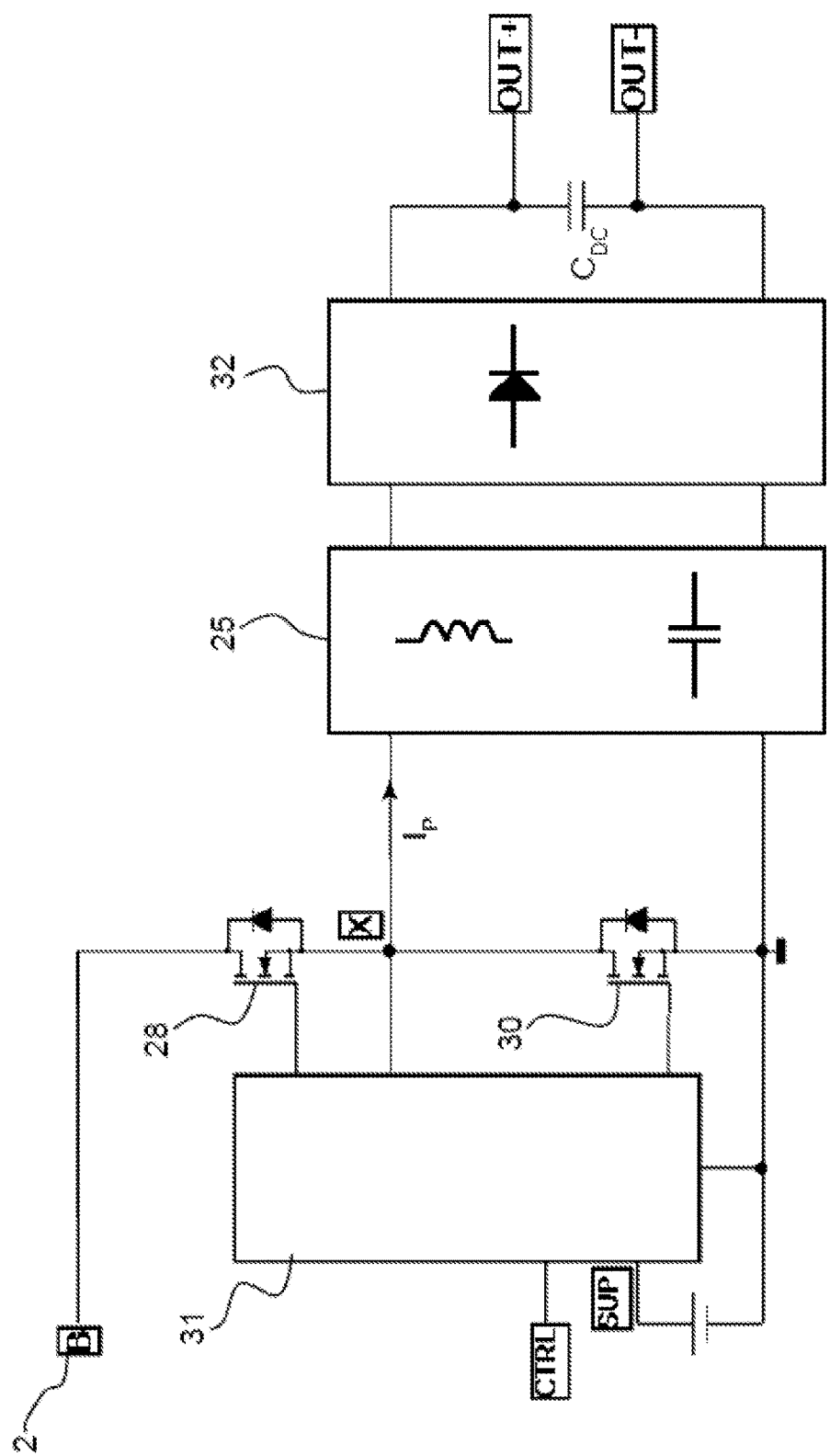
FIG. 1 shows the general architecture of a half bridge resonant converter.
Figure 2:
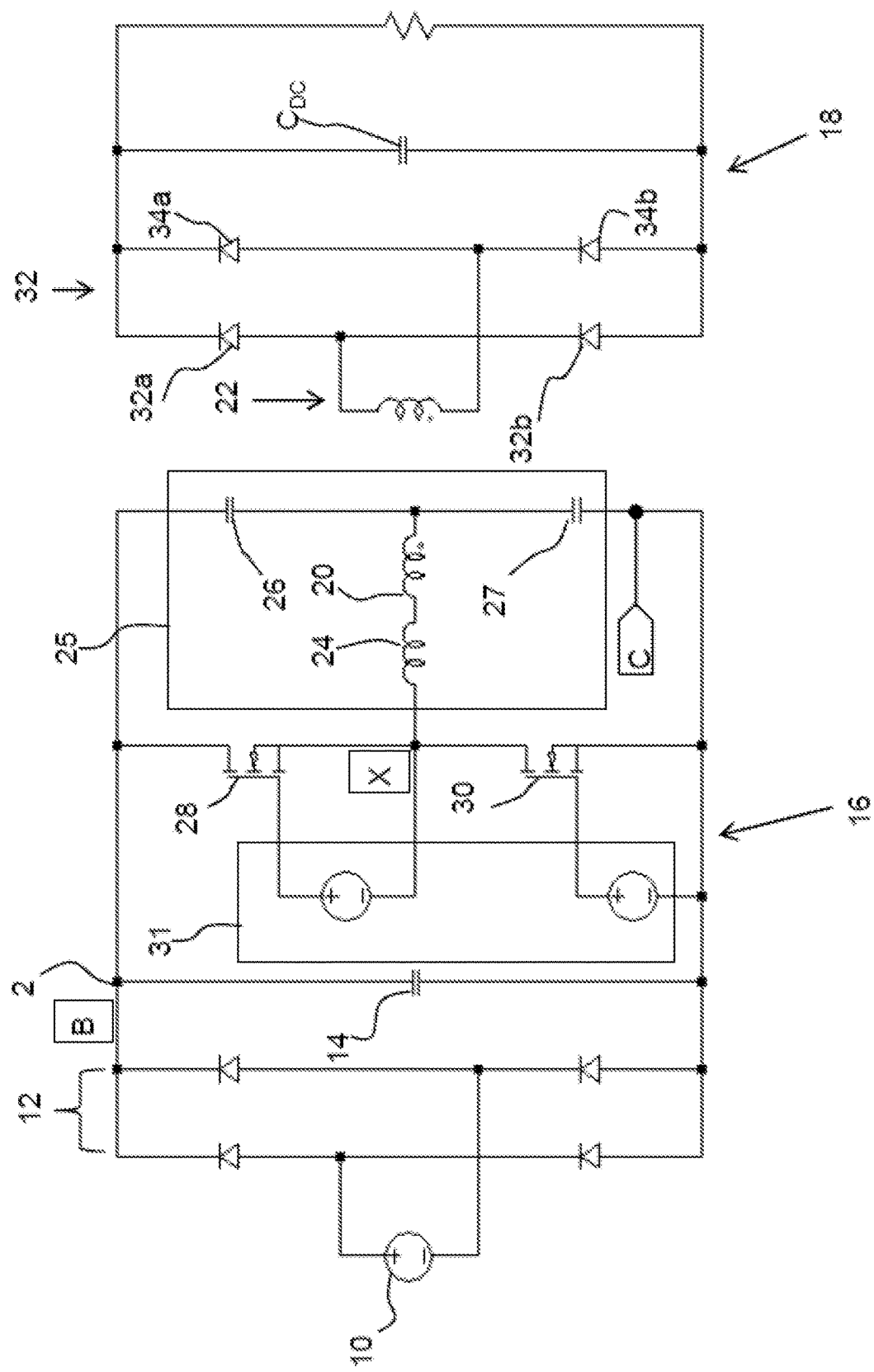
FIG. 2 shows one more specific example of a half bridge resonant converter used in a resonant AC/DC converter which forms a PFC stage.
Figure 3:
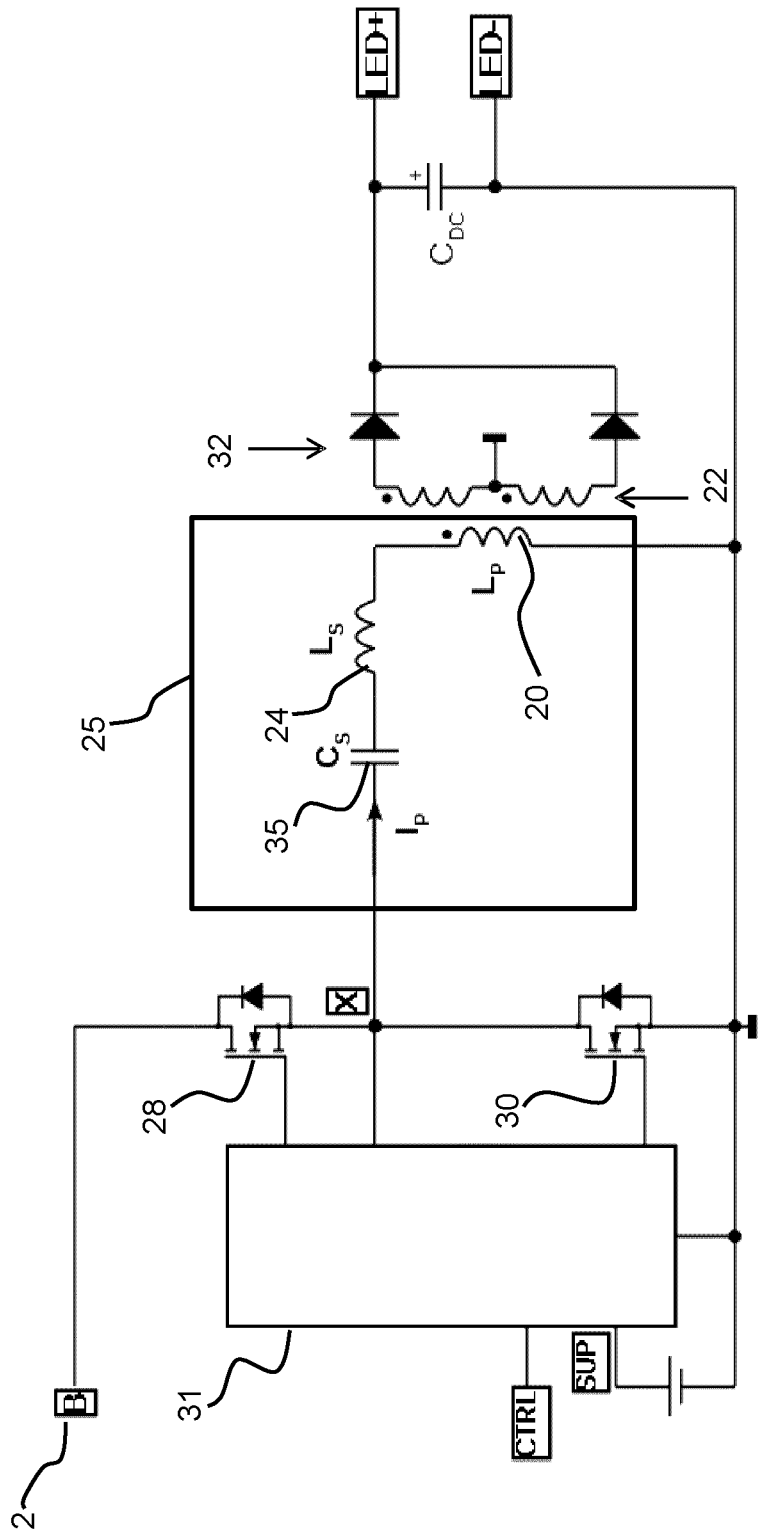
FIG. 3 shows another more specific example of a half bridge resonant converter.

As in FIG. 2, the circuit has an AC mains input 10 followed by a rectifier 12. The switches 28, 30 of the half bridge inverter are controlled by a gate driver 40 which is controlled by a controller 42. The controller 42 outputs a gate drive signal GS.

The controller is provided with a threshold value which in this example is the threshold (or reference) capacitor voltage vC_ref. The controller 42 receives the measured quantity i.e., the actual resonant capacitor voltage vC, and processes the switching scheme for the gate driver 40 that in turn controls the inverter 28, 30 and the switch node voltage Vx, i.e. the voltage at the output of the half bridge inverter.

The controller thus has an outer control loop 44 for setting a threshold level for the electrical feedback parameter (the capacitor voltage) in dependence on the output voltage vo in this example and the input voltage and current vm, im, and an inner control loop 42 for comparing the electrical feedback parameter with the threshold to derive the gate drive signal.

The outer control loop 44 implements output control as well as implementing PFC, and the inner control loop 42 derives the switching control signal.

FIG. 5 shows the controller 42 in more detail. The measured capacitor voltage vC is compared with the reference vC_ref by comparator 50, and the comparison result is used to reset a flip flop 52 which generates the output for the gate driver 40. A delay element 54 provides a delayed set pulse so that the reset operation has a fixed duration (which is a function of the clocking speed of the flip flop).

This feedback system comprises a high frequency control loop implemented by the inner control loop 42.

The outer low frequency controller 44 receives the mains voltage vm, the actual mains current im and output voltage vo and its set point vo_ref and processes, in accordance with the power factor needs, the manipulating value of vC_ref for the switching unit.

In this example, there is only one threshold value (vC_ref) that is compared to a state variable (here vC). If the state variable exceeds the threshold, the flip-flop 52 in the controller 42 is reset and the inverter is switched off via the gate driver, i.e., the switch node voltage is set to its minimum value.

The inverter is switched on again a certain time after the switch off event. This time adapted to result in a symmetric operation i.e., at a duty cycle of the switch node of 0.5.

The capacitor voltage is one example of state variable which is used as a control input for the control of the inverter switching. An alternative state variable is the transformer voltage. The scheme is similar but signs have to be changed. For example, if a threshold is exceeded the flip flop 52 in the controller 42 has to be switched on.

In another scheme, there are two thresholds. The inverter is switched off (on) once the state variable exceeds a first upper threshold and the inverter is switched on (off) if the state variable passes a second threshold. Here, the second threshold is a function of the first threshold and the input voltage.

In this way, the control circuit is adapted to set a first threshold of the electrical feedback parameter for turning on the gate drive signal and a second threshold of the electrical feedback parameter for turning off the gate drive signal.

Instead of using a transformer as isolation means, isolating capacitors may be used as well. For example, this is possible by using an extra isolating (e.g. DC blocking) capacitor between the inverter switch node and the transformer, and another between the other primary side winding terminal and the midpoint of the resonant capacitors.

Alternatively, in order to save components, the resonant capacitors can also be designed for isolating from the mains voltage (y-capacitors). Here the above mentioned state variable (vC) cannot be accessed directly any longer but can be derived by measuring and integrating the current into the isolating capacitors.

In any of these configurations, the transformer need not to be isolating and can be simplified, depending on the end use of the circuit.

There are various drive schemes that may be used for driving the high side and low side switches. Furthermore, the resonator may be self-oscillating or it may be driven by a frequency control circuit.

The circuit of FIG. 4 uses measurement of the input current to enable the power factor correction. It is also possible to provide a high power factor of a resonant PFC LLC circuit without sensing and feeding back the mains input current.

Mains input current sensing is associated with extra circuit effort and thus with extra costs and PCB area. Typically, a shunt resistor is used for the current measurement which results in power losses.

Unlike a boost converter (or other buck-derived converters) a resonant LLC converter does not offer an operation like the constant on-time mode to achieve an acceptable power factor without employing a mains current measurement.

Therefore, a control scheme for the LLC power factor pre-regulator is desired that does not require measuring the input current and still enables a power factor that satisfies e.g. the mains harmonic regulations of EN 61000-3-2.

The required behavior of a front end power stage, namely to render a (virtually) resistive input impedance i.e., an operation scheme that results in the mains input current being proportional to the mains input voltage, can be achieved by controlling, in place of the actual mains input current (im), the voltage of the resonant capacitor vC at the inverter switching instant (vC_off and/or vC_on) to be proportional to the (rectified) mains input voltage (vm).

When an LLC circuit operates at widely varying input voltages, e.g. at the rectified mains voltage, the converter (if designed correspondingly) shows an input current that is essentially proportional to the resonant capacitor voltage at the inverter switching instants vC_off or vC_on.

Thus, instead of explicitly controlling (and therefore measuring) the mains current, the voltage vC_off (or vC_on) is controlled and measured instead. The advantage is that a voltage measurement takes less circuit effort and is virtually loss-less.

Non-ideal components of the input current waveform can be further compensated, to approach a unity power factor over a wide input voltage and load range.

Figure 6:
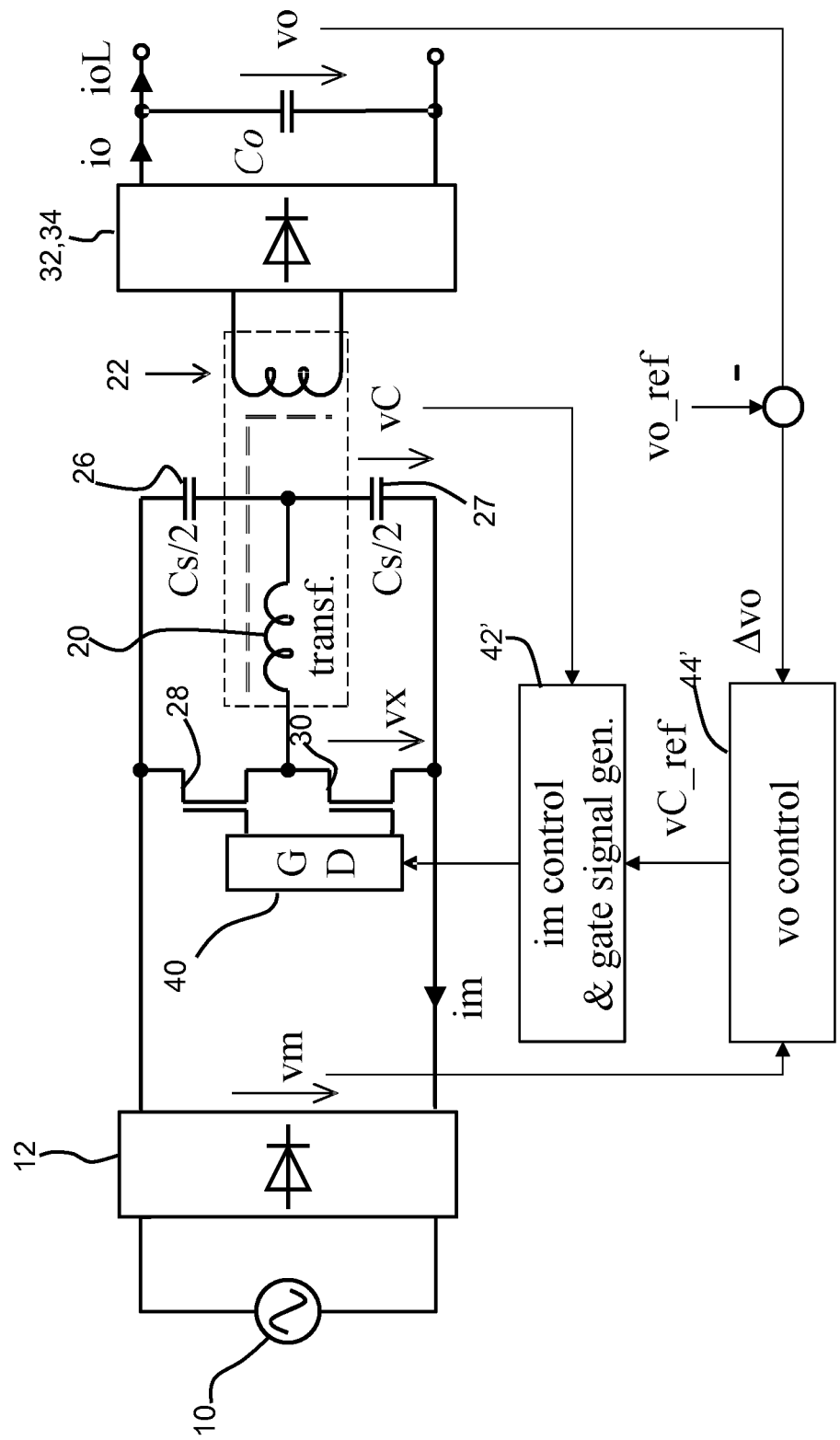
FIG. 6 shows a modification to the converter circuit of FIG. 4 to avoid the need for input current measurement.

FIG. 6 shows the LLC power converter connected to the rectified mans, and designed to deliver a high power factor. Unlike in the example described above, the mains current (im) is no longer measured and fed back.

FIG. 6 corresponds to FIG. 4, and the same reference numbers are used. Compared to FIG. 4, there is a different high frequency inner control loop 42' and a different output control loop 44'.

The outer control loop 44' again processes a difference between a desired output voltage vo_ref and a measured output voltage vo, but it does not receive a measure of the input current.

Only the output voltage (or current) is controlled explicitly in the outer control loop 44', whereas in the inner control the mains current (im) is implicitly controlled, i.e. by controlling the capacitor switching voltage vC_off (or vC_on) to follow the reference vC_ref that is generated by the outer control loop 44' and that is proportional to the rectified mains voltage (vm) and to the control error (Δvo).

Figure 7:
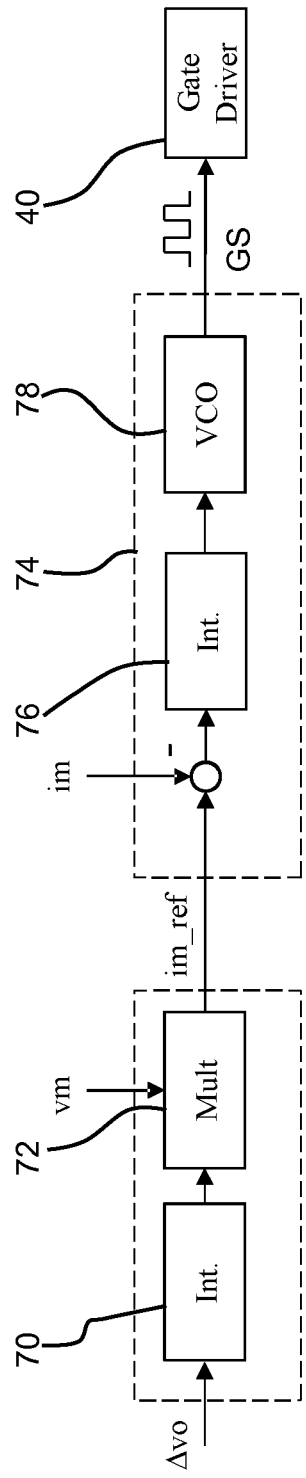
FIG. 7 shows the structure of a first PFC control that uses the LLC converter of FIG. 6 using the frequency as the manipulating variable and feeding back the mains current.

FIG. 7 shows the structure of a first PFC control that uses the LLC converter in a known manner, namely using the frequency as the manipulating variable and feeding back the mains current.

The output voltage error Δvo is integrated in integrator 70 and multiplied by the prevailing rectified mains voltage vm in multiplier 72 to derive the reference mains current im_ref.

At unity power factor, the instantaneous mains current is:

$$im=vm/Rac.$$

In the above relation, vm is the instantaneous mains voltage and Rac is the equivalent mains resistance that depends on the load and the mains rms value Vac (e.g. Vac=240 Vrms). The mains resistance can be written as $$Rac=Vac*Vac/Pac.$$

In the above relation, Pac is the rms value of the power taken by the converter. The mains current can thus be expressed by:

$$im=vm*Pac/(Vac*Vac)$$

The integrated control error is representative for the term Pac/(Vac*Vac), which is generated by the outer control loop. The product of that term with vm represents the instantaneous reference value for the mains current (im).

In a digital implementation using e.g. a microcontroller, these parameters are represented by register values whereas voltages are most convenient in an analog PFC control.

The reference mains current is provided to a frequency control unit 74 which integrates a current error using integrator 76 to provide frequency control of a voltage controlled oscillator 78.

Figure 8:
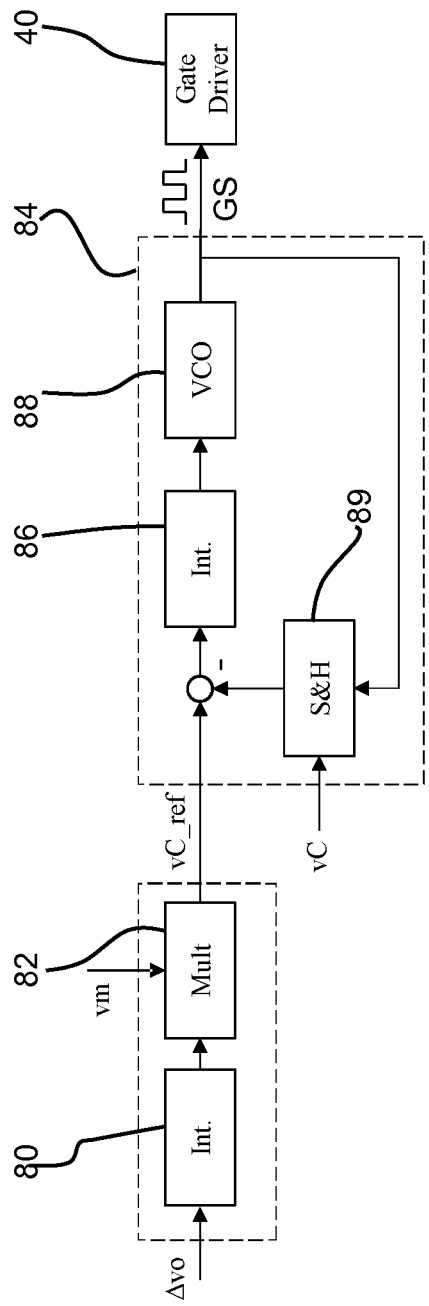
FIG. 8 shows an approach which uses frequency control but controls the resonant capacitor switching voltage to be proportional to the mains voltage.

FIG. 8 shows an approach which also uses frequency control but controls the resonant capacitor switching (or threshold) voltage to be proportional to the mains voltage (vm). This approach also implements an average threshold control.

The output voltage error Δvo is integrated in integrator 80 and multiplied by the current mains voltage vm in multiplier 82 to derive a reference capacitor voltage vC_ref. Thus, the feedback system uses the capacitor voltage as the feedback parameter.

The reference capacitor voltage is provided to a frequency control unit 84 which integrates an error signal using integrator 86 to provide frequency control of a voltage controlled oscillator 88. The error signal is representative, but not a measure of, a current error. The feedback loop comprises a sample and hold unit 89 for sampling the capacitor voltage at the switching instants. There may be one or two sampled value of vC per cycle.

This approach avoids the need for mains current measurement but still uses frequency control.

Figure 9:
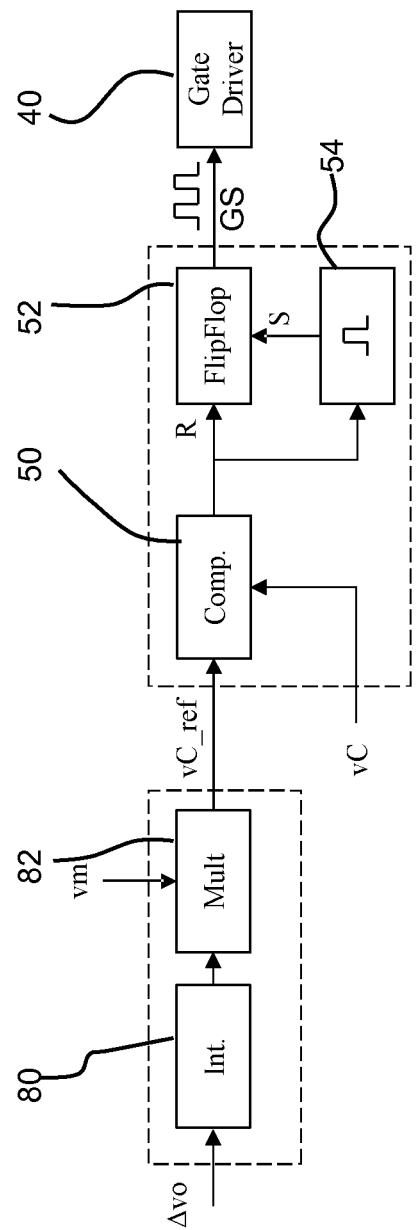
FIG. 9 shows an approach which uses threshold control to control the gate driver and which is based on control of the resonant capacitor switching voltage.

FIG. 9 shows a control implementation which does not make use of the mains input current and makes use of a self-oscillating switching approach, in which the parameter which determines the control is the capacitor voltage.

This control approach makes use of a single threshold control value. The first stage 80,82 is as in FIG. 8, and output is a reference capacitor voltage vC_ref, which is then compared with the capacitor voltage vC by comparator 50. This then controls a set and reset flip flop (as described above with reference to FIG. 5), instead of controlling an oscillator.

Figure 10:
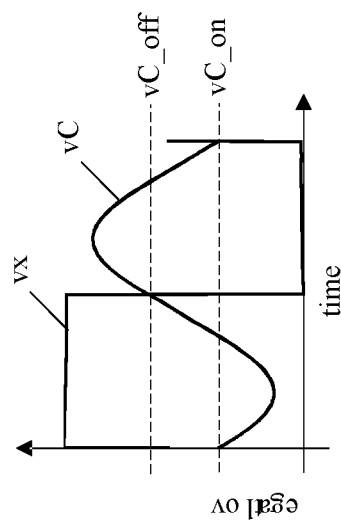
FIG. 10 shows the capacitor voltage and the threshold voltages.

FIG. 10 shows the capacitor voltage vC and the threshold (or switching) voltages vC_on and vC_off, i.e. the voltage vC at the inverter switching instant.

The time at which the capacitor voltage is sampled is the two switching instants of the node X, as shown in FIG. 10.

For this low loss and low cost current PFC control scheme, the input current waveform of the LLC can somewhat deviate from the AC input voltage resulting in non-zero total harmonic distortion. This deviation depends in part on the size of the bus (storage) capacitor. The smaller it is, the more pronounced is the 100 Hz bus voltage ripple and the more distortion results to the mains input current. Miniaturization however is needed in many converters.

Figure 11:
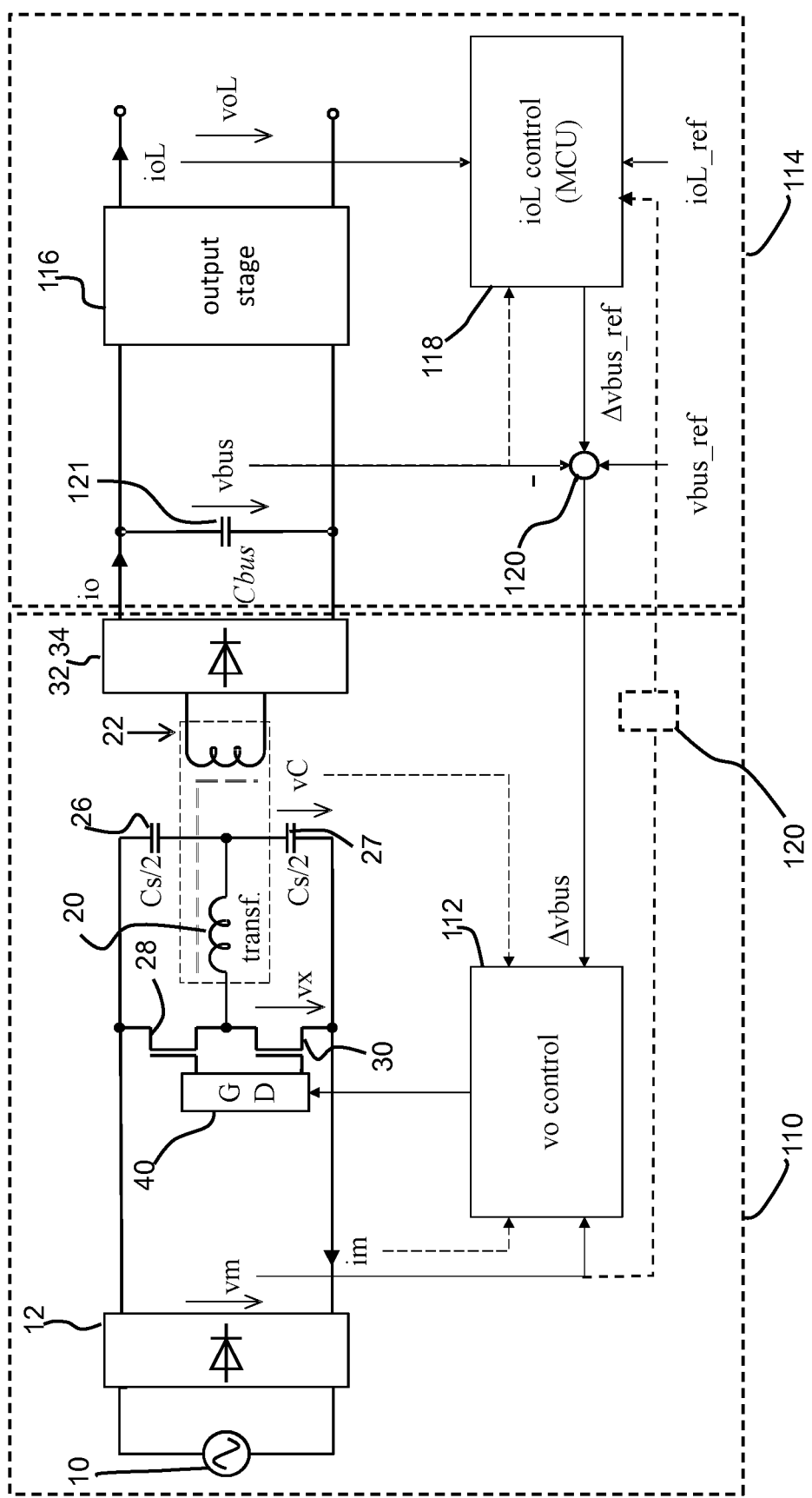
FIG. 11 shows a converter with feedback control of the PFC pre-regulator from a DC/DC output stage.

FIG. 11 shows a converter architecture which addresses this issue. The converter is a dual stage an AC/DC PFC converter. It comprises a PFC pre-regulator 110 which is in the form as shown in FIG. 4 but with a different controller 112. The PFC pre-regulator thus comprises an AC input 10, a rectifier 12, a half bridge inverter comprising a high side switch 28 and a low side switch 30, and an LLC circuit 20,24,26,27 coupled to the output.

The control circuit is again for generating a gate drive signal for controlling the switching of the high side and low side switches thereby to generate a controlled output voltage. This output voltage becomes the bus voltage vbus for an output stage 114 which comprises a DC/DC converter 116, in particular a buck converter, and a feedback unit 118 for providing a feedback signal Δvbus to the control circuit 112 of the PFC pre-regulator 110. It is used not only to feedback the control error in conventional manner, but also to modulate the controlled output voltage of the PFC pre-regulator in dependence at least on the output power.

For improving the light load or standby efficiency in particular, the set-point for the average value of the bus voltage vbus, which is an intermediate voltage between the pre-regulator and the output stage is adapted in response to the output power (per mains cycle), and preferably also an average ac input voltage.

The voltage set point may be adjustable with defined margins from a nominal set point value. For example for a given nominal set point, the voltage set-point may be increased for example by 20% for the light load or standby operation mode.

This provides a first type of control of the PFC pre-regulator.

To improve the power factor, the set-point for the bus voltage is varied synchronously with the mains voltage. Again, the amplitude of modulation may be limited for example to 10% or 20% of the bus voltage. In this way, instead of allowing the bus voltage to vary just due to the input mains variation, load, and bus capacitance, a bus voltage variation is applied via the control system in order to improve the performance in terms of PF, THD and efficiency. The imposed bus voltage variation is synchronous with the rectified input mains voltage.

This provides a second type of control of the PFC pre-regulator.

As shown in FIG. 11, the controller 112 is for providing output voltage control. For this purpose, it receives an output voltage error signal (Δvbus) as feedback signal. The feedback signal Δvbus is received from a feedback unit 118 of the output stage. This is fed back in an isolated manner for example using an opto-coupler (not shown).

The controller 112 also receives the rectified input voltage. In order to enable power factor correction, it may either receive the input current as an input or a signal which conveys information about the input current, namely the LLC capacitor voltage vC as explained above. These two signal paths are shown dotted as one or other or both may be used.

In the output stage 114, the feedback unit controls the output current ioL, based on a reference current ioL_ref in conventional manner for a current regulating DC/DC buck converter.

In addition, it derives information about the output power, for example from the bus voltage vbus and a measure of the output current ioL, or a set point for the output current if there is no explicit current measurement. This output power information is used to form a modulation signal Δvbus ref to be applied to the voltage bus level.

For low output power, the additional modulation signal is for example up to 20% of the bus voltage, as mentioned above. There may be an analog function between the output power and the modulation signal, or there may be a set of one or more discrete steps. The modulation is performed by adding this modulation signal to the output voltage error amplifier of the PFC front end. The output voltage error is vbus-vbus ref and the modulation signal is added by the adder 120 to derive a modified error signal Δvbus as the feedback signal from the output stage to the PFC pre-regulator.

The feedback unit 18 is for example a microcontroller which digitally controls the output current of the buck converter 116.

Figure 12:
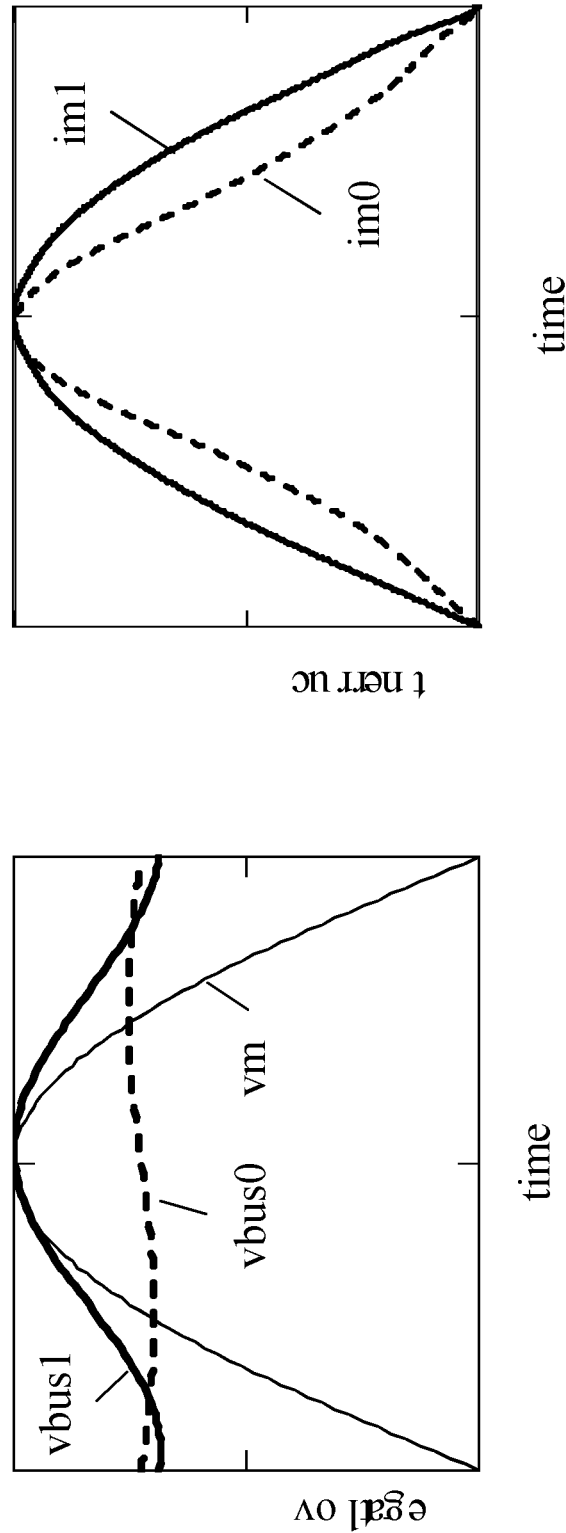
FIG. 12 shows current and voltage waveforms to explain the operation of the circuit of FIG. 11.

FIG. 12 is used to show the advantage of the dynamic modulation of the bus voltage. The bus voltage and mains voltage are shown in the left image and the mains input current is shown in the right image. The PFC pre-regulator is for example designed for universal mains ("Intellivolt" range; 110 Vac to 277 Vac±10%) and is running at 305 Vac, which is the worst case in terms of total harmonic distortion if the PFC is controlled without explicit current sensing.

As a result, the mains current will be distorted. This is shown as current plot im0 of the right image in FIG. 12 and is based on an un-modulated bus voltage vbus0 in the left image. The ripple which can be seen in the plot of vbus0 is due to the energy storage in the bus capacitor 121 (Cbus). The modulated bus voltage is shown in the left image as vbus1 with a modulation amplitude of approximately 20%. The distortion disappears almost completely as seen by the current plot im1 in the right image.

The 20% modulation depth is merely by way of example. The modulation depth is for example less than 30%, more preferably less than 25%, possibly less than 20%. It is typically more than 5%, preferably more than 10% and preferably more than 15% (of an average unmodulated value). The smaller the storage capacitor the higher the required modulation depth.

The bus voltage modulations are implemented by manipulating the feedback circuitry of the front end controller 112 through the back end controller (the feedback unit). In this way, no extra manipulating variables or control loop are needed.

The first type of modulation (for low power operation) is a function of the output power, which is a parameter that either is available in the output stage control or can easily derived from the output current ioL (or ioL_ref) and the output voltage (vo).

The second type of modulation (for improved power factor correction) depends on the mains input voltage in terms of its rms value as well as its phase.

If isolation is required between the power stages, measuring this signal would require an extra opto-isolator shown as 122 in FIG. 10. Alternatively, the mains voltage phase can be detected on the secondary side without any opto-isolator by evaluating the 100 Hz (or 120 Hz) ripple on the bus voltage (vbus). Also the switching frequency that the input stage is running at can be detected, e.g. by evaluating the HF ripple on vbus. By "high frequency" is meant higher than the mains frequency, for example the switching frequency of the resonant inverter, which is generally in the kHz range for example 100 kHz.

The higher the detected average frequency and the larger the frequency variations, the higher is the input voltage and the more the bus voltage needs to be modulated for a minimized total harmonic distortion. Thus, there are various ways to gather the signals needed for the desired bus voltage modulation.

The approach that evaluates low frequency and high frequency ripple can best be implemented by a microcontroller, which in an LED driver with digital interfaces is already employed for the interfaces and for controlling the output stage.

Note that the low frequency ripple may be used by the feedback control in order to detect the phase of the mains voltage. The bus voltage in the un-modulated case shows a 100 Hz AC ripple with a positive zero crossing at high mains and a negative zero crossing at zero mains voltage. This gives the primary phase information. For synchronizing while the modulation is active, a mains voltage observer can be used in the controller. Alternatively, the front end switching frequency can be evaluated since this signal is easily available at the secondary side (e.g. via the unfiltered transformer voltage). For an LLC converter, this frequency shows a minimum at the mains voltage zero crossings.

For the control of the half bridge in the PFC pre-regulator, in general, a control scheme is required to drive the switches 28, 30 into their on- and off-states such that the output voltage or current is regulated to a certain desired value or range of values and for a PFC circuit also to implement power factor correction.

In order to exploit best the powertrain and to achieve the maximum efficiency, it is desired to operate the converter symmetrically (at least at full load) and to load the transformer and the rectifier in the secondary side equally. In the case of a transformer with center-tapped output windings that are symmetric in terms of turn-ratios and leakages, secondary side symmetry can be assured if the duty cycle of the half-bridge (i.e., its switch node) is kept at 50%.

There are basically four transitions that the control scheme must handle:
1. Turn-on of the high-side MOSFET 28;
2. Turn-on of the low-side MOSFET 30;
3. Turn-off of the high-side MOSFET 28;
4. Turn-off of the low-side MOSFET 30.

There are several known schemes that may be used in order to achieve this.

A. Von-Voff is a control scheme where transition number 4 is initiated when some state variable crosses a certain threshold voltage (Von). Following this, the control waits for a certain time (i.e., the dead-time) before starting transition 1. This dead-time ensures that cross-conduction, or shoot-through, does not occur. The half-bridge is now in the on-state. Eventually, either the same or a different state variable will cross a second threshold (Voff), and transition number 3 will be initiated. As with the transition to the half-bridge on-state, there will then be a dead-time before transition number 2 is initiated. The half-bridge is now in the off-state, and then the procedure continues from the beginning once more. The actual values of the two thresholds are determined by an outer control loop in order to yield the correct output. This is a Von-Voff scheme in that voltage threshold controls the switching on and off.

B. Von-Ton is a control scheme where transition number 4 is initiated when some state variable crosses a certain threshold voltage (Von). As in case A, the dead-time is allowed to pass before starting transition number 1. Transition number 3 is initiated based on a certain time interval elapsing. This may be a fixed interval, or a controlled interval. After the dead-time has then elapsed, transition number 2 is initiated, and then the procedure continues from the beginning once more. The actual value of the voltage threshold is determined by an outer control loop in order to yield the correct output, and the time threshold may be fixed or controlled dynamically. This is a Von-Ton scheme in that a voltage threshold controls the turning on (after a dead time) and the time duration of the on period of the half bridge is then controlled.

C. Voff-Toff is similar to case B, except that the voltage and time thresholds define the off and on transitions of the half-bridge, respectively. Transition number 3 is initiated when some state variable crosses a certain threshold voltage (Voff). The dead-time is allowed to pass before starting transition number 2. Transition number 4 is initiated based on a certain time interval elapsing. After the dead-time has then elapsed, transition number 1 is initiated, and then the procedure continues from the beginning once more. As in case B, the actual value of the voltage threshold is determined by an outer control loop in order to yield the correct output, and the time threshold may be fixed or controlled dynamically. This is a Voff-Toff scheme in that a voltage threshold controls the turning off and the time duration of the off period of the half bridge is controlled (i.e. between turning off the high-side MOSFET and turning it on again after the time duration and dead-time).

In cases B and C, it is most often desirable to control the on (off) time such that it matches the off (on) time, i.e., it is usually beneficial to operate with a 50% duty cycle as mentioned above. In other cases, it is beneficial to operate with a defined duty cycle that is different from 50% in order to enlarge the output voltage or current window that the converter is capable of handling.

For threshold-based resonant converters (such as a self-oscillating LLC converters), there is no oscillator present in the circuit. Threshold-based switching has a particular advantage with regards to the linearity of the transfer function when using the converter to cover a wide range of input and output operating conditions, such as in an LLC PFC for example, and frequency control is not feasible in such cases due to extreme variations in the gain that cannot easily be handled.

The approach to the generation of the required voltages for switching the high side and low side power switches as explained above may be used in all of these situations.

The invention may be used in various applications, such as LED drivers in general. The converter may also be used in consumer and office electronics applications such as laptop adapters.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An AC/DC PFC converter, comprising:
  a PFC pre-regulator, comprising:
    an AC input;

a rectifier for rectifying a mains voltage;
a half bridge inverter comprising a high side switch and a low side switch, wherein an output is defined from a node between the switches;
an LLC circuit coupled to the output; and
a control circuit for generating a gate drive signal for controlling the switching of the high side and low side switches thereby to generate a controlled output voltage (vbus), wherein a high gate drive signal turns on one switch and turns off the other switch and a low gate drive signal turns off the one switch and turns on the other switch; and
an output stage, comprising:
a DC/DC converter;
a feedback unit adapted to provide a feedback signal to the control circuit of the PFC pre-regulator for modulating the controlled output voltage (vbus) of the PFC pre-regulator in dependence on at least the output power of the output stage, wherein a set-point for the controlled output voltage is varied synchronously with the mains voltage, such that an imposed bus voltage variation is synchronous with the rectified input mains voltage.

2. A converter as claimed in claim 1, wherein the control circuit is for generating a gate drive signal in dependence on an electrical feedback parameter from the LLC circuit.

3. A converter as claimed in claim 2, wherein the control circuit is adapted to set a threshold level for the electrical feedback parameter in dependence on the feedback signal and the rectified input voltage without measurement of the input current.

4. A converter as claimed in claim 3, wherein the electrical feedback parameter comprises a voltage (vC) across a capacitor of the LLC circuit, which is representative of the input current.

5. A converter as claimed in claim 4, wherein the control circuit is adapted to compare the voltage across the capacitor of the LLC circuit with a threshold at a switching instant of the gate drive signal.

6. A converter as claimed in claim 1, wherein the output stage is a switch mode power converter.

7. A converter as claimed in claim 6, wherein the output stage is a buck converter.

8. A converter as claimed in claim 1, wherein the feedback unit is adapted to provide a feedback signal to the control circuit of the PFC pre-regulator for modulating the controlled output voltage of the PFC pre-regulator in dependence on the amplitude and phase of the input voltage and the output power.

9. A converter as claimed in claim 8, wherein the amplitude and phase of the input voltage are derived by the feedback unit from the frequency of a high frequency ripple on the controlled output voltage (vbus).

10. A converter as claimed in claim 8, wherein the amplitude and phase of the input voltage are derived by the feedback unit based on a feedforward signal from the PFC pre-regulator.

11. A converter as claimed in claim 1, wherein the control unit comprises an oscillator and controls the oscillation frequency or the control unit comprises a latch and controls the timing of the latch switching.

12. An LED driver, comprising:
an AC/DC PFC converter as claimed in claim 1.

13. An AC/DC PFC conversion method, comprising:
operating a PFC pre-regulator by:
rectifying a mains voltage;
controlling a half bridge inverter comprising a high side switch and a low side switch by generating a gate drive signal and providing an output from a node between the switches to an LLC circuit thereby to generate a controlled output voltage, wherein a high gate drive signal turns on one switch and turns off the other and a low gate drive signal turns off the one switch and turns on the other switch; and
providing an output from the LLC circuit to an output stage; and
operating the output stage by:
implementing DC/DC conversion; and
providing a feedback signal from the output stage to the PFC pre-regulator for modulating the controlled output voltage of the PFC pre-regulator in dependence on at least the output power of the output stage, wherein a set-point for the controlled output voltage is varied synchronously with the mains voltage, such that an imposed bus voltage variation is synchronous with the rectified input mains voltage.

14. A method as claimed in claim 13, comprising providing a feedback signal to the PFC pre-regulator for modulating the controlled output voltage of the PFC pre-regulator also in dependence on amplitude and phase of the input voltage.

15. A method as claimed in claim 14, comprising deriving the amplitude and phase of the AC input:
from the frequency of a high frequency ripple on the controlled output voltage; or
from a feedforward signal from the PFC pre-regulator.

* * * * *